Feb. 17, 1970 A. MARZOCCHI 3,495,646
REINFORCEMENT FOR VULCANIZED RUBBER-LIKE PRODUCTS
AND METHOD OF MAKING SAME
Filed Feb. 21, 1968 3 Sheets-Sheet 1
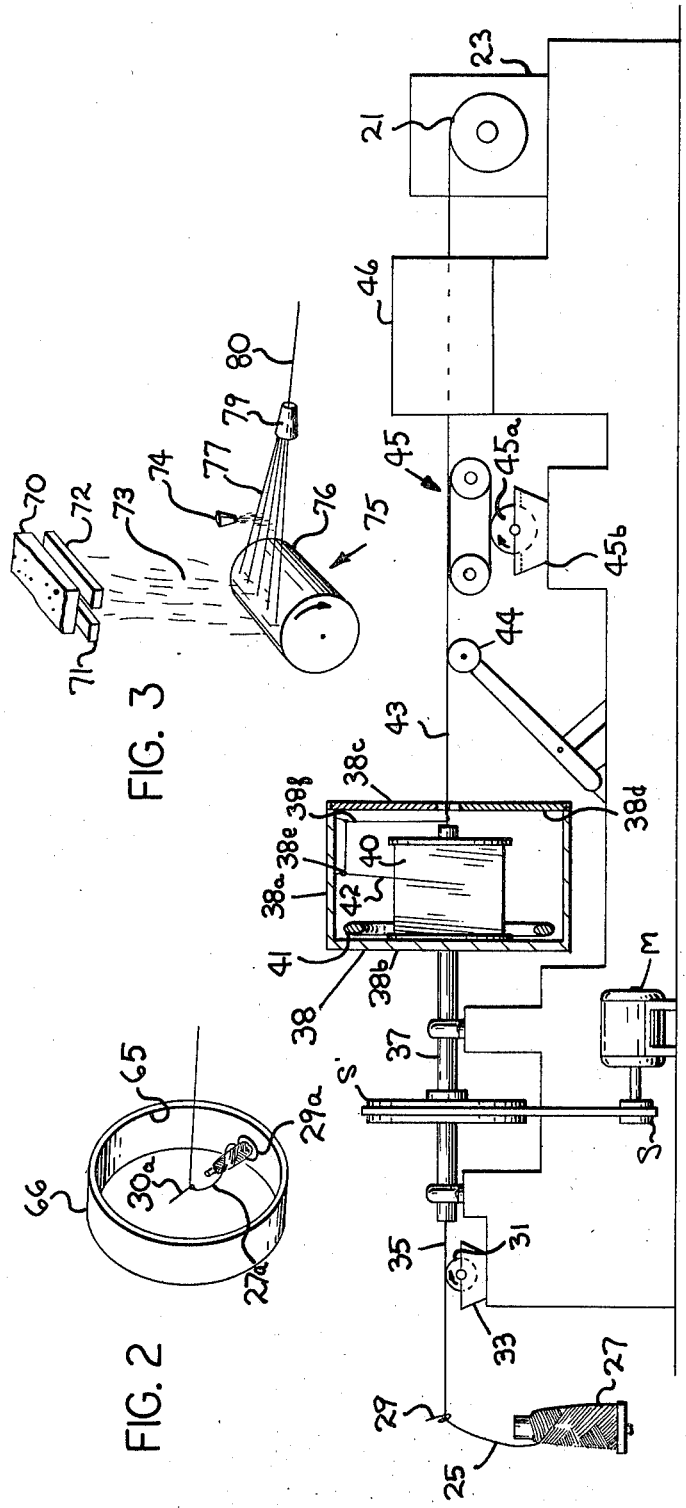
INVENTOR.
ALFRED MARZOCCHI
BY
*Staelin + Overman*
ATTORNEY Feb. 17, 1970     A. MARZOCCHI     3,495,646
REINFORCEMENT FOR VULCANIZED RUBBER-LIKE PRODUCTS
AND METHOD OF MAKING SAME
Filed Feb. 21, 1968     3 Sheets-Sheet 2

INVENTOR.
ALFRED MARZOCCHI
BY
ATTORNEYS

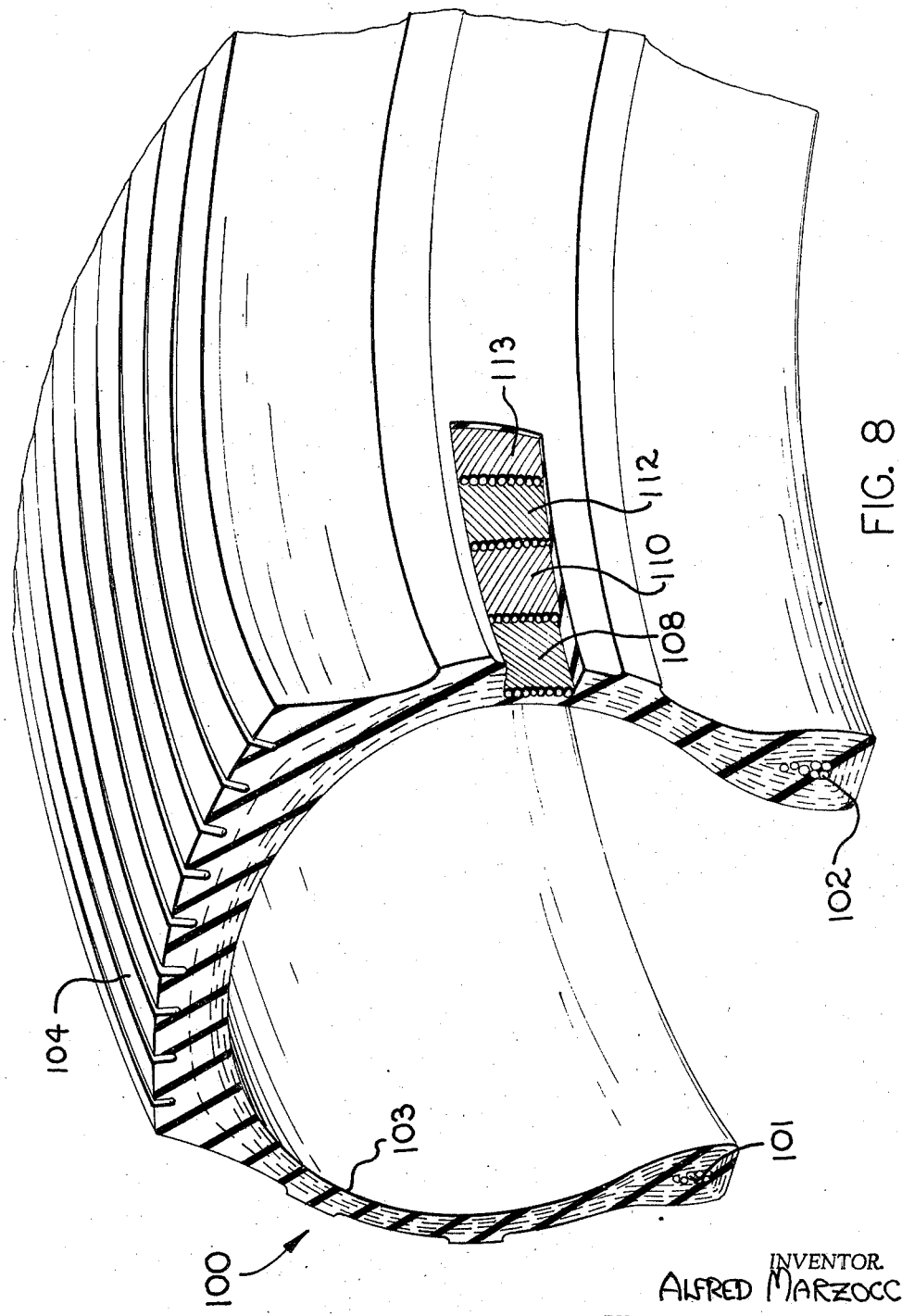

United States Patent Office 3,495,646
Patented Feb. 17, 1970

3,495,646
REINFORCEMENT FOR VULCANIZED RUBBER-LIKE PRODUCTS AND METHOD OF MAKING SAME
Alfred Marzocchi, Cumberland, R.I., assignor to Owens-Corning Fiberglas Corporation, a corporation of Delaware
Filed Feb. 21, 1968, Ser. No. 707,193
Int. Cl. B60c 9/12
U.S. Cl. 152—359                    25 Claims

ABSTRACT OF THE DISCLOSURE

A reinforcement system for elastomeric products, e.g., vulcanized, molded, rubber-like goods such as tires, belts and the like; the reinforcement including an elongate member in the form of a continuous cord or a chopped length of said cord; the cord including a core formed of a plurality of continuous mineral, e.g., glass, filaments held together in part by an exterior sheath formed of a second material, usually synthetic, e.g., organic, composed and disposed to exert radially compressive forces on the core and thereby reducing the tendency of the member to experience buckling when subjected to axially compressive forces; said components preferably being encapsulated in an elastomeric matrix.

---

It is a principal object of the present invention to provide a reinforcement which is at least in part composed of glass and in part composed of other elongate filamentary material; the combination permitting the attainment of a vulcanized rubber product which contains some of the remarkable properties of glass, while at the same time serving to accommodate, by reason of the combination, some of the inherent troublesome properties of glass.

A variety of materials have in the past been used to reinforce rubber in the vulcanized state. By rubber, as used herein, is meant to include, of course, not only natural rubber but all of the synthetic rubber-like materials such as the butadiene-styrene polymers, the butyl rubbers, the neoprene rubbers and the newer synthetic polyisoprene and polybutadiene materials of the stereo specific type.

The reinforcement materials employed up to the present time are many and varied. They include natural occurring materials such as cotton and, as well, synthetic materials such as rayon, nylon, polyesters, polypropylene, ethylene propylene copolymer, etc. The foregoing textiles have been employed in the form of cords, yarns and fabrics. Additionally, steel wire has been employed. The most familiar utilization of steel wire is to form the bead reinforcement of the tire. More recently, steel wire has been employed in the formation of "belt" or "breaker" plies in the European radial-type tire. These plies extend circumferentially about the tire beneath the tread and laterally co-extensive therewith.

Glass fibers, as such, have also been suggested as a reinforcing material for pneumatic tires. U.S. Patent No. 2,184,326 discloses broadly the utilization of glass fibers as such or in mat form as a tire reinforcement.

It is a major object of the present invention to provide a reinforcement which is superior to the known natural and synthetic or organic materials as well as metal and heretofore known glass reinforcements, particularly in terms of its performance under dynamic conditions. Thus, the reinforcement material embodied in the present invention is believed to be improved in many respects, particularly in that it avoids the shortcomings of the other materials.

For example, cotton degrades when exposed to moisture and demonstrates severe elongation. Rayon is possessed of a low modulus and, as well, a low strength per unit cross-sectional area. The polyamides, for example, nylon, while stronger than rayon, undergo considerable elongation and yield under load. The polyamides, e.g., nylon, when employed as a tire reinforcement, impart to the tire an undesirable thump due to flat spots which form in the tire when the automobile upon which mounted sets in cool weather. All of the presently conventional tire cord textiles are beset with the problem that the sizing of tires is very difficult due to the uncontrollable elongation and yield. Thus, tires purporting to be of a given size, when produced by different manufacturers and different facilities, yield tires which do not match in overall dimension and are considerably variant in strength.

Glass as a reinforcement for rubber possesses a number of properties which are eminently desirable considered in and of themselves. These desirable properties of glass include an essentially 100% elasticity, essentially no yield under stress, e.g., the extensibility does not exceed 3 to 4%, excellent dimensional stability and immunity to the changes inherent in varying atmospheric conditions. On the other hand, glass possesses a number of properties which differ considerably from the synthetic or organic materials and therefore presents definite problems of translating the inherently good properties into actual realization. By way of example, glass has a stiffness measured at 322 grams per denier (g.p.d.), whereas polyamides (nylon) ranges from 18 to 23 g.p.d., polyesters range from 11 to 21 g.p.d., the acrylics such as Acrilan and Orlon range from 7 to 10 g.p.d. and viscose rayon from 11 to 25 g.p.d. Glass also has a very low breaking elongation measuring 3–4%, whereas the value for polyesters is 19–30%, the value for nylon is 16–40%, the value for Acrilan is 36–40%, the value for viscose rayon is 9–30%. Also to be considered is the high specific gravity of glass which is 2.54 compared to 1.14 for nylon and the acrylics, 1.5 for rayon and from 1.22 to 1.38 for two typical polyesters, namely, Kodel and Dacron. Additionally, in terms of toughness on a denier basis, glass is quite low with a value of 0.07 compared to nylon's 0.75, rayon's 0.20, Dacron polyesters' 0.5 and acrylic Orlon's value of 0.4.

From the foregoing, it can be concluded that glass possesses advantageous properties as well as disadvantageous properties from the standpoint of successful utilization as a reinforcement for vulcanized rubber products such as tires, belts, hose and the like.

It is an object of the present invention to provide a reinforcement which consists, at least in part, of glass and to so employ the glass component as to provide, insofar as possible, a successful utilization of the desirable properties while compensating for or eliminating those properties which are undesirable or which are at least at considerable variance with the conventionally utilized synthetic, natural and/or organic textile reinforcement materials.

It is another object of the present invention to provide a method of producing continuous reinforcement material in elongate form; at least a portion of said material being composed of glass in filament, strand or cord configuration.

It is still another object of the present invention to provide rubber-like bodies reinforced in accordance with the techniques of the present invention and particularly to provide tire constructions featuring the reinforcement system in accordance with the present invention.

It is a particular object of the present invention to provide a cord-like reinforcement material which includes a plurality of glass components and, in combination therewith, an arrangement of materials calculated to overcome the propensity for glass to buckle or fail when subjected to axially compressive forces.

It is also an object of the present invention to provide a reinforcement which can be so produced as to possess a variety of characteristics dependent upon the relative amounts of glass and the modifying material and, as well, the configuration and makeup of the glass component, the modifying component and, as well, the composition of the latter.

The foregoing, as well as other objects of the present invention, will become apparent to those skilled in the art from the following detailed description taken in conjunction with the annexed sheets of drawings on which there are presented, for purposes of illustration only, several variant embodiments of the present invention including particular constructions and processes for producing same.

In the drawings:

FIG. 1 is a schematic perspective view illustrating an array of equipment operative to provide a continuous sequence of steps or stations definitive of a process for producing a continuous elongate reinforcement material in accordance with the present invention;

FIG. 2 is a perspective view of an alternate feed arrangement which may be substituted for one or more of the stations illustrated in the process illustrated in FIG. 1;

FIG. 3 is a perspective view of an alternate feed arrangement which may be employed in the process illustrated in FIG. 1;

FIG. 8 is a perspective view of a tire in which portions have been broken away to show the interior carcass cords featuring cord composition and makeup in accordance with the present invention.

The present invention envisions a reinforcement system in the form of an elongate composite cord inclusive of glass elements in combination with one or more natural or sythetic material in elongate form, preferably in surrounding sheath-like relationship as to impart to the overall structure capabilities of reinforcement not heretofore known.

The present invention further envisions a novel continuous method for producing a composite elongate reinforcement material capable of performing in accordance with the intended accomplishment.

It is still a further object of the present invention to provide a reinforcement yarn or cord construction which, as viewed in cross-section, is generally circular and consequently more acceptable to the manufacturers of vulcanized rubber products who are historically most desirous of working with such elongate reinforcement cord materials.

Figures 4, 5, 7:
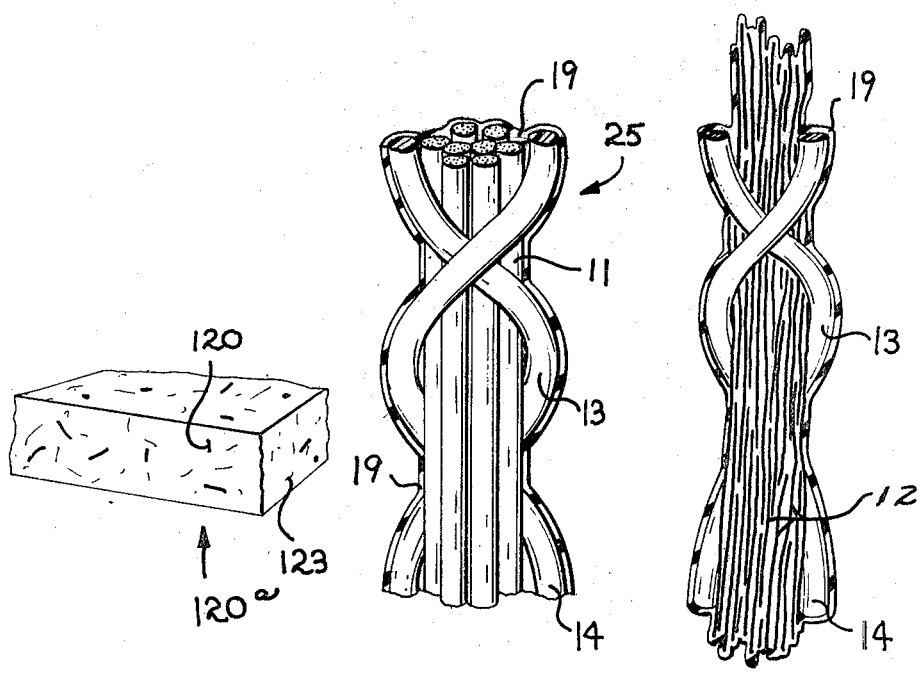
FIG. 4 is an enlarged schematic view of a segment of a length of reinforcement material, with portions having been broken away to show the interior constructional details of the reinforcement.
FIG. 5 is a perspective view of a segment of a band of rubber-like material containing, distributed therethrough, short lengths of reinforcement in accordance with the present invention.
FIG. 7 is a view similar to FIG. 4 illustrating a variant reinforcement construction in accordance with the present invention.
Figure 6:
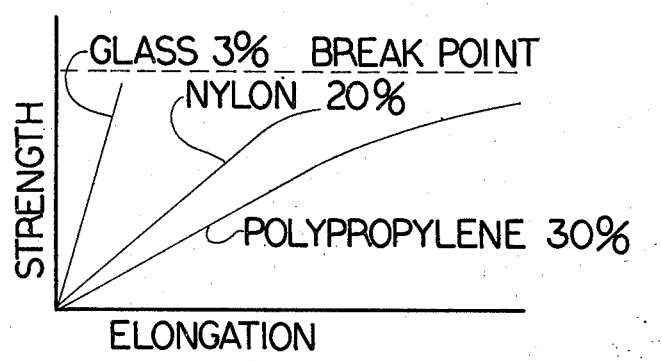
FIG. 6 is a graph illustrating pictorially the relative elongation of various materials employed in fabricating reinforcement materials in accordance with the present invention.

Reference to FIG. 4 will most clearly reveal the nature of the construction of the reinforcement in accordance with the present invention. In FIG. 4, reference numeral 11 identifies a plurality of gathered-together filaments of glass or strands of glass, each of which strands is formed in turn of a plurality of continuous filaments of glass. As shown in FIG. 4, the filaments or strands 11 are generally in parallel disposition and are embedded in an elastomeric matrix, usually imparted by an impregnation as will be described more fully hereinafter. Wound about the filaments or strands 11 are a plurality of elongate plastic or synthetic members 13 in generally spiral disposition. The reference numeral 14 identifies an organic or synthetic filament which may be like or different to the filament or strand 13 but of opposite spiral disposition. The composite cord 25 bears a coating 19 of elastomeric material, again imparted usually by an impregnation technique as described more fully hereinafter. The impregnant coating preferably permeates throughout the interstitial voids between the glass filaments and/or strands.

Referring now to FIG. 7, there is disclosed a variant construction which is very similar to that of FIG. 4 excepting that the core of the composite cord is formed of discontinuous filaments 12 in gathered proximity. The formation of such a core is discussed in connection with FIG. 3 hereinafter.

An arrangement for producing the structures hereinabove described is illustrated in FIG. 1. A windup spool 21 driven by a motor (not shown) located in housing 23 draws a strand 25 from a supply spool 27 containing a length of a strand or yarn material composed of a plurality of discrete continuous filaments of glass. The strand is drawn from the supply spool upwardly through an eyelet 29 and then horizontally across a rotating roller 31 in contacting relationship therewith. The roller rotates in a pan 33 containing a suitable impregnant and consequently coats the strand with the impregnant. The coated strand 35 passes axially through a hollow shaft 37 and thence through a bell member 38 carried by the shaft. The shaft is driven by a motor M, transmitting its rotary motion thereto through sheaves S and S'. The bell member includes an outer annular wall 38a, a side wall 38b and semicircular segments 38c and 38d which form the wall opposite side wall 38b. The segments 38c and 38d are hingedly connected to the annular wall 38, permitting access to the interior. The mating edges of the segments 38c and 38d define an aperture. Within the bell-shaped member is a package 40 in the form of a spool containing a supply of continuous nylon, polyester or similar organic strand material. Also within the bell member is an electrical heating member 41 for heating up the chamber, causing the organic to stretch as it is pulled from the spool or package 40 in tension. The organic yarn material identified by the numeral 40 passes upwardly through eyelet 38e and eyelet 38f, then downward, being wrapped about the glass strand. Rotation of the bell member 38 together with the pull of windup spool 21 to which organic yarn and the glass strand are attached causes the organic to be wrapped while at its elevated temperature. The combination yarn material 43 then passes over an idler roll 44, an impregnation station 45, through an oven 46 and then to the windup roll 21. The impregnation station consists of an endless belt arrangement; the belt contacting a roller 45a rotating in a pan 45b containing an impregnant. The oven 46 serves to partially cure the impregnants carried by the combination yarn 43. It will be appreciated that increased tension and stretch can be imparted to the organic being withdrawn from the spool 40 by a suitable tensioning device. It will also be appreciated that two or more braided spiral wraps of organic may be employed in order to yield a dynamically balanced structure by substituting a suitable braiding head for the rotating bell member 38. It is also envisioned that a second and/or third rotating bell member can be employed for wrapping a second or third spiral wrap of organic material about the glass core bearing one or more previously applied spiral wraps of organic material. Of course, suitable adhesive and/or compatible impregnant stations would also be employed.

It will be appreciated that the system of FIG. 1, inasmuch as it involves mergement of a plurality of different strands, etc., as well as changes in direction, etc., may well include appropriate and suitable breaking and tensioning devices and control apparatus therefor in order to achieve the optimum in accomplishment. The choice of placement of these is believed, however, to be within the ordinary skill of the artisan and they are therefore specifically not included in the drawings since their inclusion would likely obscure the understanding of the system as presently envisioned.

Referring to FIGS. 2 and 3, there are disclosed various feed arrangements for the core component in the form of a multiplicity of glass filaments. In FIG. 2, the supply spool 29a is mounted on the inner surface 65 of a cylindrical collar 66 mounted for rotation at a predetermined angular velocity whereby the strand 27a proceeds through an eyelet 30a and thence horizontally through the remainder of the stations of FIG. 1. The rotation of collar 66 imparts a twist to the basic core composed of a multiplicity of glass filaments. In such instance, namely, the use of a core of glass filaments employing a twist, there may be wound about but a single elongate wrap of organic filament or strand sufficiently to counterbalance the twist in the core.

In FIG. 3, there is disclosed an alternate feed station in place of the spool 29 of FIG. 1. In place of continuous glass strand, the arrangement of FIG. 3 yields discontinuous fibers in a gathered-together strand. Reference numeral 70 identifies the bottom of a platinum bushing in which are melted glass marbles. A large number of tiny holes are contained in the bottom from which are drawn filaments of glass. Spaced manifold chambers 71 and 72 having facing apertured surfaces provide jets of air which aid in attenuating the filaments moving downwardly therebetween and also break the continuous filaments into lengths 73 measuring from 1-8 inches. The lengths fall by gravity onto a hollow collecting drum 75 having a foraminous cylindrical wall 76 whereby, as vacuum is impressed on the drum 75, the lengths collect on the surface. As the collecting drum rotates, as indicated by the arrow, the short lengths are gathered convergingly, as at 77, into a composite length aided by the forming die 79. The ultimate stable fiber yarn 80 proceeds horizontally through the remainder of the stations, as illustrated in FIG. 1. A nozzle 74 sprays a suitable binder or size onto the lengths as they are drawn together.

It is a feature of the present invention that the core of the ultimate composite strand is formed of a plurality of filaments of glass. Filaments of glass are more or less rods of extremely thin cross-section. Considering the flexibility and the fragility of glass, they are in and of themselves relatively subject to buckling when gathered into mutually contacting gathered array. In accordance with the present invention, however, the spiral wrap, constituting a sheath-like covering, of organic yarn or filament which has been first stretched prior to wrapping about the parallel filaments yields a supporting or restrictive effect since the organic, upon cooling, will return to its original length but, being held by the successive applications of the impregnant, this tendency to return will be resisted whereupon the entire structure will undergo a radially inward movement, holding the individual parallel core elements securely against the buckling effect caused by axially compressive forces.

It will be appreciated from the above that the material forming the outer wrap may be stretched prior to being combined with the core glass filaments. On the other hand, the material may be employed in its natural state and later subjected to a stimulus which will tend to cause the originally combined length to contract to a shorter length. Of course, there are any number of conditions which may operate as a suitable stimulus for either stretching or contraction of the outer sheath material, depending upon the selection of the material. The stimulus may be temperature. It may be a particular solvent or exposure to a given liquid, gaseous environment, to a given wave excitation; all of which will be determined by the particular selection of the organic material. In the case of nylon, of course, it is known that an elevated temperature will allow the nylon yarn or filament to be stretched as described in connection with FIG. 1 and that upon the return of the temperature to its normal level, the nylon will tend to contract to its original length. It will be appreciated that a wide variety of organic and/or synthetic yarns and strands may be employed to form the outer sheath in spiral disposition as represents a preferred embodiment. Thus, in place of nylon, there may be employed the polyester materials, the acrylic fibers, such as Acrilan, various vinyl materials, etc. With many of the organic yarns, exposure of the organic wrapped glass yarn to an elevated temperature will cause a contraction of the organic yarn to produce an increased tightness in the composite cord or bundle.

The glass filaments of which the core is composed will have been pretreated when drawn from the bushing preferably with a "size" composition calculated to enhance the compatibility of the ultimate composite yarn with the elastomeric matrix in which the composite yarn, strand or cord will be embedded as a reinforcement. A suitable "size" is composed of 0.5-2.0 percent by weight of gamma-aminopropyltriethoxy silane, 0.3-0.6 percent by weight of a lubricant and the remainder water.

Other amino silanes are eminently satisfactory.

The impregnant material employed in stations 31, 46 and 60 may be a natural or synthetic rubber compound dissolved in sufficient of a suitable solvent therefor to form a liquid which can be coated or imparted to the moving strand in the manner compatible with the apparatus as illustrated in FIG. 1. One suitable impregnant composition is listed in Table 1 below.

TABLE 1

| | Parts by weight |
|---|---|
| Neoprene rubber | 100 |
| Powdered magnesium oxide | 4 |
| Powdered zinc oxide | 5 |
| Channel black | 15 |
| Thiate B (trialkyl thiourea accelerator) | 1 |

The foregoing ingredients after being mixed on a mill are combined with sufficient of a suitable rubber solvent to form a liquid impregnant bath.

Another suitable impregnant is composed of about 60 parts by weight of 38 percent dispersed solids inclusive of a butadiene-styrene-vinyl pyridine terpolymer latex, a butadiene styrene latex and a resorcinol-formaldehyde resin in combination with about 40 parts by weight of water. The 38 percent dispersed solids system is marketed under the trade name "Lotol 5440" by Uniroyal, formerly U.S. Rubber Company.

The composite continuous cord-like structure formed of the core of glass filaments and an outer sheath of synthetic or organic filament, strand or yarn is readily converted into tire cord fabric on suitable weaving apparatus. The resulting fabric can be bias cut and incorporated into tire constructions as bias plies or as belt plies. Reference to FIG. 8 reveals a tire 100 composed of spaced beads 101 and 102 connected by a toroidally extending carcass 103 carrying a ground contacting tread 104 in the crown region thereof. As shown by the breakaway at 106, the carcass is composed of four plies 108, 110, 112 and 113, each composed of mutually parallel cords which are inclined oppositely in adjacent plies.

The cord structure of the present invention may also be employed in belt plies, which, rather than extending from bead-to-bead, extend from shoulder-to-shoulder just beneath the tread region and peripherally about the tire. Whether used as a cord reinforcement extending from bead-to-bead or in the formation of belt members extending from shoulder-to-shoulder, the cord structure of the present invention will be found resistant to compressive loads and forces which are imposed or borne axially by the cord reinforcement.

The cord construction of the present invention can be modified to provide a number of arrangements. One such arrangement consists in providing the spiral overwraps of organic in spaced relationship with the previous wind to yield somewhat of a corkscrew effect. Such a cord structure, considering that the organic is somewhat larger in diameter than the core formed of continuous or staple glass yarn, would exhibit improved physical securement in the elastomeric matrix whether in the form of a continuous cord as a component of a ply or as a chopped length of random reinforcement as described hereinafter.

The elongate cord-like reinforcement material in accordance with the present invention, in addition to being utilized in continuous lengths in various products, may be desirably added to rubber and rubber-like compositions during the mixing cycle as relatively short chopped lengths which, by reason of the construction as described above, will impart considerable reinforcement to the elastomeric rubber-like matrix in the form of a vulcanized product.

In particular, it has been found that relatively short lengths of bundles of glass filaments lend considerable strength to the alternate molded rubber product, both in terms of resistance to tear and ultimate modulus. Optimum results in this regard are obtained when there are present in the rubber matrix both bundles and individual filaments. Frequently, however, the chopped bundles formed solely of glass filaments or glass strand components, even though held together by an elastomeric impregnant, are found to be subject to degradation in the mixing cycle. Thus, in the mill mixing of the bundles into the basic elastomeric stock, the bundles measuring ¼ to 3 inches in length lose their bundle identity, reverting completely to individual filaments and, in extreme cases, to essentially particles of glass. The breakup of the bundles is accentuated if the mixing is allowed to continue too long. As indicated, a molded product containing only glass filaments is not nearly as desirable in terms of its properties as a molded product containing both bundles and filaments.

In accordance with the present invention, the individual short lengths of bundles, each of which is composed of a central core, composed of individual gathered-together filaments and an outer spiral wrap of synthetic or organic strands holding the filaments together, are capable of enduring a more rigorous mixing cycle, as might be necessary or desirable with some stocks, without an accompanying degradation of the bundles into completely filamentary material filler.

Additional processing advantages accruing by reason of the present invention reside in the fact that since it is desired that the ultimate stock have a proportion of both the individual filaments and the integral bundles, it is possible to expedite production by having two separate but simultaneous additions to the basic stock on the mill. One addition consists of chopped bundles not containing the sprial sheath overwrap of organic and a second addition consists of the chopped bundles formed of the reinforcement material in accordance with the present invention; that is, having a core of continuous gathered-together glass filaments and a surrounding spiral sheath of an organic; for example, nylon or the like. Under these circumstances, the same mixing cycle would reveal that the reinforcement not containing the spiral overwrap of organic was separating into individual filaments while the proportion of reinforcement in accordance with the present invention would retain its bundle integrity, thus resulting in an ultimate stock and molded product containing both filaments and bundles.

With respect to the employment of chopped bundles of the present invention as a reinforcement, it is observed that the spiral overwrap of organic or synthetic material provides improved integration of the bundle into the surrounding matrix due to the increased surface area and also by reason of the spiral configuration itself.

Another advantage residing in the utilization of the reinforcement material in accordance with the present invention resides in the fact that the more integral bundles by reasons of the organic spiral overwrap will permit a longer mixing cycle whereby there can be achieved, in the milled stock removed, a greater degree of orientation of the bundles parallel to the moving stock on the mill. For certain applications, it is most desired that the bundles exhibit a considerable amount of orientation in a given direction. Up to the present time, this has presented a considerable problem inasmuch as, in order to achieve desired orientation, it was necessary to keep the stock on the mill longer; this resulting in a reduction in the amount of retained bundle configuration as opposed to discrete individual filaments. A vulcanized segment of rubber-like material containing both integral bundles 120 and individual filaments 123 is shown in FIG. 5; the slab being identified by the reference numeral 120a.

A still further advantage in the practice of the present invention resides in the availability of extrusion techniques for the bundle-containing stock material due to the unusual integrity of the bundles by reason of the spiral sheath overwrap.

The hot air oven 62 is, of course, only typical of a suitable treatment. Other treatments may be substituted as will convert the ultimate cord to a relatively nontacky state as to assist in the further processing of the elongate cord wound on the spool 21. Thus, the oven 62 may be replaced by a chamber controlled as to the atmosphere within, in terms of a retained gas, as is adapted to convert at least the outer surface skin of the impregnant to a dry, nontacky state while being insufficient to materially affect the major proportion of the impregnant, whereby it retains its capability of being further vulcanized in the ultimate cure of the molded rubber good in which the reinforcement of the present invention finds itself, whether it be tire, V-belt, hose, or other mechanical rubber good.

While I have disclosed in considerable detail the manner of carrying out my invention both in terms of formulation and process steps, it will be appreciated that variations and substitutions may be made without, in fact, departing from the inventive concept. Accordingly, all such modifications, variations and substitutions in material are intended to be included within the scope of the invention.

I claim:

1. A flexible, continuous cord-like structure comprising a core including an assembled plurality of mineral filaments, an outer sheath formed of elongate material extending in surrounding relationship with said assembled plurality of filaments and a vulcanizable elastomeric impregnant substantially surrounding said structure, said sheath comprising an endless length of material spirally wrapped about said core, said length exerting radially inward compressive forces on said plurality of filaments.

2. The structure as claimed in claim 1, wherein said mineral filaments are continuous glass fibers.

3. The structure as claimed in claim 2, wherein said spiral sheath is formed of a material selected from the group consisting of cotton, rayon and the organics including the polyamides, polyacrylics, polyesters, polyvinyls, polyolefins, polyacetates, etc., and mixtures thereof.

4. The structure as claimed in claim 1, wherein said mineral filaments are staple glass fibers and the repeated winds of said spiral wrapping are spaced sufficiently that ends of said staple fibers protrude from said core.

5. The structure as claimed in claim 4, which includes an elastomeric impregnant enveloping said core and said staple fiber ends but leaving said ends as distinct entities.

6. A vulcanized rubber-like body which has distributed therethrough a plurality of short lengths of the cord structure as claimed in claim 1.

7. A vulcanized body as claimed in claim 6, wherein said distribution is substantially random.

8. A vulcanized body as claimed in claim 6, wherein a proportion of said relatively short lengths are substantially oriented in a particular direction.

9. The structure as claimed in claim 1, wherein at least a portion of said plurality of filaments are in twisted array.

10. The structure as claimed in claim 9, wherein said sheath of spirally wrapped elongate material is so composed and disposed as to counteract the imbalance due to the twist of said filaments.

11. The structure as claimed in claim 2, wherein said sheath is composed of two oppositely disposed spiral wraps of elongate material.

12. A vulcanized rubber body which has positioned interiorly thereof, in mutually parallel relationship, a plurality of continuous cord-like reinforcement structures as claimed in claim 1.

13. In a tire construction composed generally of rim engaging means, a connected toroidal carcass and a ground engaging tread carried at the crown of said carcass, the improved construction comprising, as the carcass reinforcement, at least one ply composed of a plurality of mutually parallel cord structures, said structures being defined in claim 1.

14. A vulcanized rubber-like body which has positioned interiorly thereof, in mutually parallel relationship, a plurality of continuous cord-like reinforcement structures as claimed in claim 2.

15. In a tire construction composed generally of rim engaging means, a connected toroidal carcass and a ground engaging tread carried at the crown of said carcass, the improved construction comprising, as the carcass reinforcement, at least one ply composed of a plurality of mutually parallel cord structures, said structures being defined in claim 2.

16. The method of producing a continuous length of composite inorganic/synthetic yarn structure which comprises:
(1) moving a plurality of gathered-together glass filaments along a linear path,
(2) drawing a continuous length of synthetic material from a supply source,
(3) wrapping said material spirally about said plurality of gathered-together glass filaments while said plurality is moving in said linear path,
(4) exposing said assembly to a stimulus operable to cause a contraction of said material and
(5) collecting said formed composite structure in suitable means.

17. The method as claimed in claim 16, wherein said glass filaments of step (1) are impregnated with an elastomeric impregnant before step (3).

18. The method as claimed in claim 16, wherein the product of step (4) is impregnated with an elastomeric impregnant.

19. The method as claimed in claim 16, wherein a second length of synthetic material is combined with the product of step (3).

20. The method as claimed in claim 16, wherein said glass filaments are continuous.

21. The method of producing a continuous length of composite inorganic/organic yarn structure which comprises:
(1) moving a plurality of gathered-together glass filaments in a linear path,
(2) drawing a continuous length of extensible material from a supply source,
(3) treating said length of extensible material sequentially along its length to effect a temporary stretching of said length,
(4) wrapping said material, while stretched, about said plurality of gathered-together glass filaments while said plurality is moving in said linear path and
(5) collecting said formed composite structure in suitable means.

22. The method as claimed in claim 21, wherein said glass filaments of step (1) are impregnated with an elastomeric impregnant before step (3).

23. The method as claimed in claim 21, wherein the product of step (4) is impregnated with an elastomeric impregnant.

24. The method as claimed in claim 21, wherein a second continuous length of extensible material is stretched and wrapped about said plurality of glass filaments but in a direction of wind opposite to the first length.

25. A linear reinforcement for elastomeric goods comprising a core composed of a plurality of filaments formed of a material having an extensibility not in excess of 3–4 percent and a surrounding sheath of a length of spirally wound elongate material, which length tends to contract to a smaller dimension whereby restrictive forces are exerted inwardly on said core of filaments, reducing the propensity of said linear reinforcement to buckle when subjected to compressive axial forces.

References Cited

UNITED STATES PATENTS

| 143,743 | 10/1873 | Binns | 57—141 |
|---|---|---|---|
| 2,598,829 | 6/1952 | Pollard | 57—141 |
| 1,884,069 | 10/1932 | Mendel | 57—157 XR |
| 2,184,326 | 12/1939 | Thomas | |
| 2,335,644 | 11/1943 | Camp | 57—149 XR |
| 3,243,338 | 3/1966 | Jackson | 57—144 XR |
| 3,279,161 | 10/1966 | Chisholm et al. | 57—162 XR |
| 3,311,152 | 3/1967 | Marzocchi et al. | 152—359 |
| 3,315,722 | 4/1967 | Marzocchi et al. | 152—359 |
| 3,323,975 | 6/1967 | Marzocchi et al. | 57—144 XR |

DONALD E. WATKINS, Primary Examiner

U.S. Cl. X.R.

57—149, 162